US009638167B2

(12) United States Patent
Schnetgoeke et al.

(10) Patent No.: US 9,638,167 B2
(45) Date of Patent: May 2, 2017

(54) METHOD AND DEVICE FOR THE RAPID OIL CHANGE ON DRIVE DEVICES OF WIND POWER PLANTS

(75) Inventors: Hanno Schnetgoeke, Kiel (DE); André Tubbesing, Osterroenfeld (DE)

(73) Assignee: SENVION SE, Hamburg (DE)

( * ) Notice: Subject to any disclaimer, the term of this patent is extended or adjusted under 35 U.S.C. 154(b) by 777 days.

(21) Appl. No.: 14/009,232

(22) PCT Filed: Mar. 9, 2012

(86) PCT No.: PCT/EP2012/054158
§ 371 (c)(1),
(2), (4) Date: Oct. 1, 2013

(87) PCT Pub. No.: WO2012/130592
PCT Pub. Date: Oct. 4, 2012

(65) Prior Publication Data
US 2014/0044519 A1  Feb. 13, 2014

(30) Foreign Application Priority Data

Apr. 1, 2011  (DE) .................. 10 2011 015 858

(51) Int. Cl.
*F03D 7/00*   (2006.01)
*F03D 1/00*   (2006.01)
*F03D 80/70*  (2016.01)

(52) U.S. Cl.
CPC ............. *F03D 7/00* (2013.01); *F03D 1/003* (2013.01); *F03D 80/70* (2016.05);
(Continued)

(58) Field of Classification Search
CPC . F03D 1/003; F03D 7/00; F03D 80/70; F05B 2260/79
See application file for complete search history.

(56) References Cited

U.S. PATENT DOCUMENTS 1,927,864 A     9/1933  Aikman
5,454,960 A *  10/1995  Newsom ............. B65D 19/004
                                                  123/196 A (Continued)

FOREIGN PATENT DOCUMENTS

DE  10 2008 027 365  12/2009
DE  10 2008 057 455   5/2010

(Continued)

OTHER PUBLICATIONS

International Search Report and Written Opinion mailed Jun. 5, 2012, directed to International Application No. PCT/EP2012/054158;20 pages.

*Primary Examiner* — Woody Lee, Jr.
(74) *Attorney, Agent, or Firm* — Morrison & Foerster, LLP

(57) ABSTRACT

The invention relates to a method for performing an oil change on a wind power plant, comprising the steps of rotating the rotor (3) to a maintenance position, subsequently draining the oil out of a first variable-speed gearbox (6), filling the first variable-speed gearbox (6) with fresh oil, draining the oil out of a second variable-speed gearbox (6') that is oriented differently than the first gearbox, and filling the second drive device (6') with fresh oil. The variable-speed gearboxes each comprise a sump (63) having a first outlet opening (65) and a mirrored sump (64) on the opposite end of the housing thereof having a second outlet opening (66). Thus, the rotor (3) does not need to be rotated further during the oil change. The oil change can be performed simultaneously on several or all variable-speed gearboxes, reducing time and personnel expenses. The invention further relates to a correspondingly designed drive device and to an oil changing device.

16 Claims, 3 Drawing Sheets

(52) U.S. Cl.
CPC ..... *F05B 2260/602* (2013.01); *F05B 2260/79* (2013.01); *F05B 2260/98* (2013.01); *Y02E 10/72* (2013.01)

(56) References Cited

U.S. PATENT DOCUMENTS

| | | | | |
|---|---|---|---|---|
| 5,540,264 | A * | 7/1996 | Harp | B67D 1/0842 |
| | | | | 141/106 |
| 2005/0034925 | A1* | 2/2005 | Flamang | F16H 57/0402 |
| | | | | 184/6.12 |
| 2005/0254949 | A1 | 11/2005 | Schubert | |
| 2011/0168494 | A1* | 7/2011 | Subramaniam | F03D 80/70 |
| | | | | 184/6.12 |
| 2011/0168495 | A1* | 7/2011 | Subramaniam | F03D 11/0008 |
| | | | | 184/6.12 |
| 2011/0247710 | A1 | 10/2011 | Siegfriedsen | |
| 2012/0104752 | A1* | 5/2012 | Tsutsumi | F03B 13/264 |
| | | | | 290/44 |

FOREIGN PATENT DOCUMENTS

| | | |
|---|---|---|
| EP | 1 296 084 | 3/2003 |
| EP | 1 596 064 | 11/2005 |
| FR | 714 621 | 11/1931 |
| WO | WO-03/031812 | 4/2003 |

\* cited by examiner

METHOD AND DEVICE FOR THE RAPID OIL CHANGE ON DRIVE DEVICES OF WIND POWER PLANTS

REFERENCE TO RELATED APPLICATIONS

This application is a national stage application under 35 USC 371 of International Application No. PCT/EP2012/054158, filed Mar. 9, 2012, which claims the priority of German Application No. 10 2011 015858.8, filed Apr. 1, 2011, the entire contents of which are incorporated herein by reference.

FIELD OF THE INVENTION

The invention relates to oil changes on drive devices of wind power plants, especially motors and gearboxes for pitch adjustment devices.

BACKGROUND OF THE INVENTION

Modern wind power plants customarily have a wind-powered rotor, the rotor blades of which are variable with regard to their angle of incidence (so-called pitch adjustment). To this end, drive devices are provided on the wind-powered rotor. As a rule, the drive devices are arranged in the rotor hub, wherein for reasons of power output and redundancy a separate drive device is associated with each rotor blade.

In general, drive devices, such as gearboxes and motors, require lubrication in order to forestall premature wear phenomena. The lubrication is usually carried out with oil. As a result of abrasion, the oil becomes contaminated and has to be changed regularly in the course of a maintenance. Thus, oil changes have to be carried out regularly even in the case of wind power plants. This requires the presence of a fitter in the engine nacelle of the wind power plant, which necessitates considerable expenditure especially in the case of a large number of wind power plants in a wind farm and/or in the case of wind power plants which are installed a distance away, for example in the case of offshore wind power plants.

A manual method for carrying out an oil change in the case of drive devices of wind power plants is described in the unexamined German application DE 10 2008 027 365 A1. According to this, in a first step the wind-powered rotor is rotated into a specified position (maintenance position) so that an oil sump of the drive device is located with its outlet opening at the bottom (relative to the drive device). The oil in the drive device is then over the outlet opening. By opening the outlet opening, the oil is drained and collected in a waste oil container. For filling with fresh oil, the wind-powered rotor is rotated by 180 degrees so that the outlet opening of the now emptied drive device is located at the top. The fresh oil is poured in and the outlet opening closed again. This process is repeated for each one of the other drive devices. Since the drive devices of such wind power plants are customarily arranged in the rotor hub with different orientation (specifically so that they have the same relative position in each case in relation to the rotor blade which is operated by it), the wind-powered rotor has to be further rotated each time in order to achieve the respective positions for emptying and filling. In the case of a wind power plant with a three-bladed wind-powered rotor, at least five rotations of the wind-powered rotor, starting from the maintenance position, have to consequently be carried out for an oil change of the drive devices. The high cost as a result of the repeated rotation of the wind-powered rotor, which requires a lot of time for one thing and a large number of personnel for another thing, is the disadvantage of this method.

From another field of technology, specifically the automobile industry, it is known to rapidly remove the oil and fill up with oil again through a single opening with the aid of a pump device. This device, however, is quite large and heavy and because of this is not suitable for portable use. It is therefore unsuitable for use during maintenance of wind power plants.

SUMMARY OF THE INVENTION

An advantage of the invention is reducing time consumption and cost of personnel for an oil change in wind power plants and ultimately to reduce the costs of an oil change or of the maintenance of wind power plants.

A solution according to the invention lies in the features as broadly described herein. Advantageous developments are subjects of the detailed embodiments described below.

Proposed is a method and an arrangement, with which the method can be carried out, that can accelerate the oil change on wind power plants and also reduce the personnel cost. The disclosure also extends to correspondingly designed drive devices and to an oil change device.

In the case of a method for carrying out an oil change on a wind power plant, which has a tower with an engine nacelle located thereupon on which a rotor with a plurality of rotor blades is rotatably attached and the rotor has a plurality of drive devices arranged with different orientation, comprising rotating of the wind-powered rotor into a maintenance position, subsequent draining of the oil from a first drive device, filling of the first drive device with fresh oil, draining of the oil from a second drive device, which is oriented differently to the first drive device, and filling of the second drive device with fresh oil, it is provided according to the invention that a first closable outlet opening on a sump of the first drive device is rotated into a geodetic low point in the maintenance position of the rotor and the drive devices, on an end of their housing opposite the sump, have in each case a mirrored sump with a second closable outlet opening, wherein the draining of the oil from the second drive device is carried out by means of the second closable outlet opening so that the rotor, during and between the draining of oil from the first drive device and second drive device, can maintain its rotated position.

Some of terms used may be explained below.

That rotated position of the wind-powered rotor in which an oil change is to be carried out is understood by a maintenance position. Thus, the so-called Y-position, in which one of the rotor blades is oriented vertically downward, can be defined as the maintenance position for a three-bladed rotor, for example. In the case of correspondingly positioned outlet openings, each of the other rotor positions can also be used as the maintenance position.

The installed position of the drive device on the rotor is understood by its orientation. It is different for the individual drive devices, that is to say they are not oriented parallel to each other. As a rule, it will be so that the drive devices are oriented in a manner offset relative to each other by an angle which is produced by 360 degrees being divided by the number of rotor blades. In this way, the drive devices can be located in each case in an identical relative position in relation to the respectively associated rotor blade.

A trough-like design, which is arranged geodetically beneath a cavity containing a fluid so that the fluid from the cavity is collected therein, is understood by a sump. This can be the sump in a gearbox housing, for example. The fluid can be drained via an outlet opening which is arranged at the geodetic low point. A functionally similar structure at the opposite end of the cavity of the housing is understood by a mirrored sump. If the housing is oriented so that the mirrored sump is at the bottom, the second outlet opening is located at the geodetic low point accordingly.

According to the invention, the rotor only needs to be rotated once into the maintenance position at the start for the oil change. The rotor does not need to be further rotated in the course of the oil change on the individual drive devices thanks to the invention, in contrast to the known prior art. As a result, the time consumption of the oil change is considerably reduced. In particular, not only time-consuming rotation of the rotor is saved as a result, which on account of the removal and reinstallation of safety devices which are required for it, particularly against inadvertent rotation of the wind-powered rotor, is time and personnel intensive. With the invention, it is thus made possible to carry out the oil change with the aid of only one oil-change device on a plurality of drive devices at the same time or consecutively without the position of the rotor being altered. A further advantage of the invention is that the process can be carried out by a single person so that as a result of the invention the personnel cost is also considerably reduced.

The draining of the oil can preferably be assisted by pumping out. The emptying of the drive device is carried out more rapidly so that less time is required. Moreover, a more reliable and more complete emptying can be achieved as a result. Additionally or alternatively, the filling of the drive device with fresh oil can be assisted accordingly by pumping and/or by using compressed air which is introduced into the drive device. The filling can therefore be carried out not only more rapidly but also more reliably.

It can be especially preferred if the drained and/or replenished oil volumes are automatically controlled. This means that after the draining of, or filling with, a preadjustable amount of oil the process of draining or filling is automatically terminated. As a result of this automization, the cost which is required for the oil change is reduced. Furthermore, the reliability with which the oil change is carried out in increased. The automated procedure could be carried out in such a way that only the draining and filling process proceeds in an automated manner in each case and after the draining process the filling process has to be started separately, or that the filling process is started automatically after termination of the draining process.

In order to further reduce the cost required for the oil change, a bi-directional line is advantageously used both for the emptying as well as for the filling with fresh oil. The cost which is required for the laying and connecting of lines to the drive devices is reduced as a result. The more drive devices are provided in the wind power plants, the greater is this effect.

The invention can be extended further to a drive device for implementation of the method according to the invention. To this end, in the case of the drive device with a housing which encloses an oil chamber and which on a lower end of the housing in a first position has a sump which at the geodetic low point has an outlet opening for accommodating a drain valve, it is provided according to the invention that at one end of the housing, opposite the sump, a mirrored sump is provided and has a second outlet opening for accommodating a second drain valve and the mirrored sump is designed in such a way that in a second position different from the first position the second outlet opening is located at the geodetic low point. A plurality of outlet openings can be provided in the housing wall both in the region of the sump and in the region of the mirrored sump.

With the mirrored sump, it is made possible to reliably drain the oil from the drive device even when it is not located in its first position (with the normal sump towards the bottom) but located in a rotated or in an almost or completely inverted second position (tilted position). As a result, the constructional requirements for easier implementation of the method according to the invention are created in an outstandingly simple and expedient manner.

An oil level indicator is preferably provided for the mirrored sump. In this case, it can be a sight glass, for example, the attachment or construction of which (with marking lines or the like) relates to the mirrored sump. As a result, monitoring of the amount of oil in the drive devices can be carried out both during manual as well as during the preferred automated operation, in fact even when the drive devices are not in the first position. It especially proves to be successful if the oil level indicator for the mirrored sump is constructionally combined with an oil level indicator for the sump. With a reduced number of parts and less complexity, the oil level can thus be monitored both for the sump as well as for the mirrored sump. In this way, it indicates the oil level regardless of position. A further preference of this combined construction lies in a protection against an erroneous reading since there is just one (combined) oil level indicator and so there is no risk of reading the incorrect oil level indicator which is associated with the other sump. The drive devices for the individual rotor blades can therefore be of similar construction regardless of their installed position. As a result, the number of parts is reduced and repair and also exchange are simplified.

A quick-release coupling is advantageously arranged as a drain valve in at least one of the outlet openings. As a result, pipe connections, especially for carrying away the waste oil or for supplying the fresh oil, can be attached quickly and reliably to the drive devices. The oil change is consequently made easier and the risk of operating errors reduces.

Furthermore, a vent valve can be arranged on the sump and/or a dummy plug can be arranged at the outlet opening. The vent valve enables the emptying of the mirrored sump via the second outlet opening to be carried out more rapidly.

This is not compulsory, however. If the speed of the oil change plays no role, a dummy plug can also be provided. It may be noted that with these options the drive devices are different from each other and are no longer exchangeable for a conventional drive device with an oil change only in the first position.

Furthermore, a separate residual-volume screw can be provided on the sump and/or on the mirrored sump. With this, a more complete emptying of the drive devices can be achieved. As a rule, the operation of the residual-volume screw will not be necessary for the regular oil change but remains subject to particular situations, for example inspections.

The invention can be extended further to an oil change device and an arrangement for the automated oil change on wind power plants with the described drive devices by means of such an oil change device. The oil change device has a control unit, a fresh oil supply and waste oil disposal, and a connecting hose with a headpiece which is designed for connecting to a drive device, especially to a pitch drive or to an azimuth drive, of a wind power plant, wherein according to the invention it is provided that the control unit for the implementation of the method is designed according to one of the preceding embodiments. According to a further embodiment, the oil change device, alternatively or additionally to the controlling, can be designed for the simultaneous connection to a plurality of drive devices.

Provision is expediently made for a separate flushing line which can be connected to the second outlet opening of the drive device and is operated from a pressure source during the draining. By means of such a flushing line, the emptying of the drive device can be accelerated without recourse having to be made to a suction function. Furthermore, the flushing line provides the opportunity to flush the drive device with oil and therefore also to remove larger quantities of abraded material from the drive device. A breather valve is advantageously provided for the flushing line. As a result, it can also be used for the filling of the drive device, depending upon its position.

The connecting hose, in a preferred embodiment, can comprise a hose set with a plurality of headpieces. The multiplicity of headpieces is preferably matched to the number of drive devices (i.e. just as many) so that the oil change can be carried out on all the drive devices at one time. To this end, the connecting hose can comprise a distribution piece which branches the connecting hose to the plurality of headpieces. In a further embodiment, the oil change device can also be provided with a plurality of hose connections, however, as a result of which a plurality of drive devices can be connected to the oil change device at the same time by a connecting hose in each case.

The connecting hose is advantageously of a bi-directional design. This makes it possible to first of all drain the waste oil and subsequently to replenish with fresh oil by means of the same hose. The oil change device expediently has a waste-oil connection to a waste-oil container and/or a fresh-oil connection to a fresh-oil container. The oil change device itself does not then need to have a container for the waste oil or for the fresh oil but can utilize existing containers. As a result, it becomes more compact and more manageable.

A further advantage features the use of safety oil valves. These valves only open if a compatible hose coupling is fixedly connected to them. Consequently, it is ensured that the oil does not prematurely escape from the outlet opening or that oil which is possibly still in the drive device does not escape after removing the hose. This reduces the risk of damage to the environment, which is particularly relevant in the case of offshore wind power plants since the increased risk here is that the oil cannot be collected in sufficient time.

The oil change device is preferably created in its dimensions or its weight so that it can be carried and especially operated by one person alone.

BRIEF DESCRIPTION OF THE DRAWINGS

Further characteristics and advantages of the invention are subsequently made clear based on an exemplary embodiment of the invention which is explained with reference to the attached drawing. In the drawing.

DETAILED DESCRIPTION OF THE INVENTION

The invention is explained based on an example of a wind power plant with three rotor blades.

Figure 1:
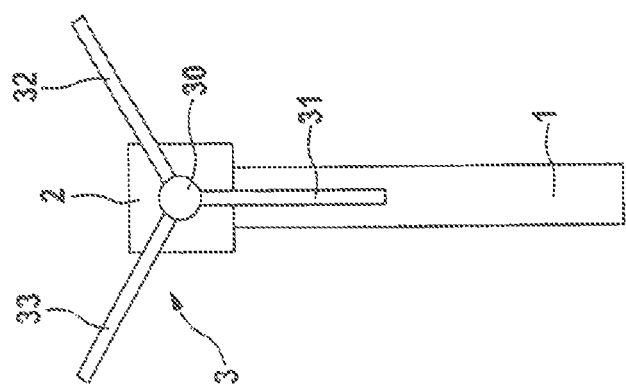
FIG. 1 shows a schematic representation of a wind power plant.

FIG. 1 shows the schematic construction of a wind power plant. It has a tower 1 with an engine nacelle 2. The end face of the engine nacelle 2 has a rotatably mounted rotor 3. The rotor 3 has a rotor hub 30 on which two rotor blades, or a plurality of rotor blades 31, 32, 33, are adjustably arranged. For this exemplary embodiment, a position of the rotor 3, in which one of the rotor blades 31 is oriented vertically downward, is defined as the maintenance position, as shown in FIG. 1.

Arranged in the rotor hub 30 are a plurality of drive devices 6, 6', of which there are three in the exemplary embodiment, with which the incidence angle of the rotor blades 31, 32, 33 can be adjusted. Each of these drive devices 6, 6' is associated with one of the rotor blades 31-33.

The drive devices 6, 6' have a housing 60 with a flanged-on driving head 61. The housing 60 encloses an oil chamber 62 for lubricating oil. At one end, the chamber has a sump 63 with a first outlet opening 65 for the lubricating oil. Arranged in the center region is a sight glass 67 which forms a marking for a desired oil level 5. A second sump is designed as a mirrored sump 64 at the opposite end of the oil chamber 62. A second outlet opening 66 is associated with the second sump. Diametrically to the second outlet opening, an additional second outlet opening 66' can optionally be provided on the mirrored sump 64. As a result, even in the case of an unfavorable shape of the mirrored sump 64 (see dashed line in FIG. 4), a reliable draining of the lubricating oil is ensured. A second sight glass 68, which indicates the respective oil level of the drive devices 6' in a tilted orientation for the rotor blades 32, 33, is associated with the mirrored sump 64.

Figure 3:
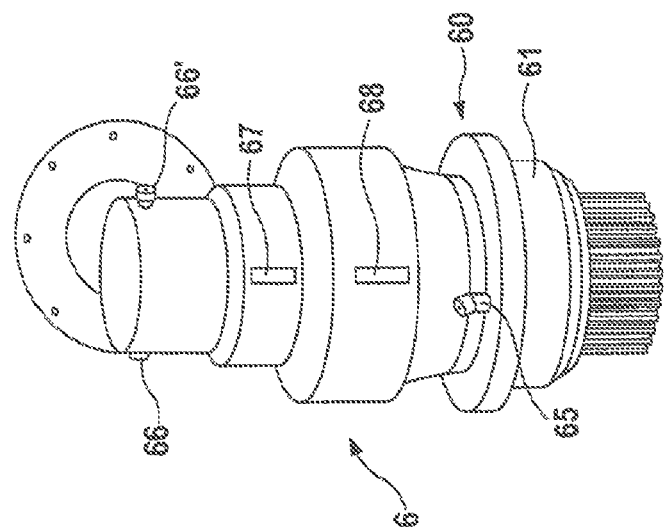
FIG. 3 shows a schematic representation of a drive device.
Figure 2:
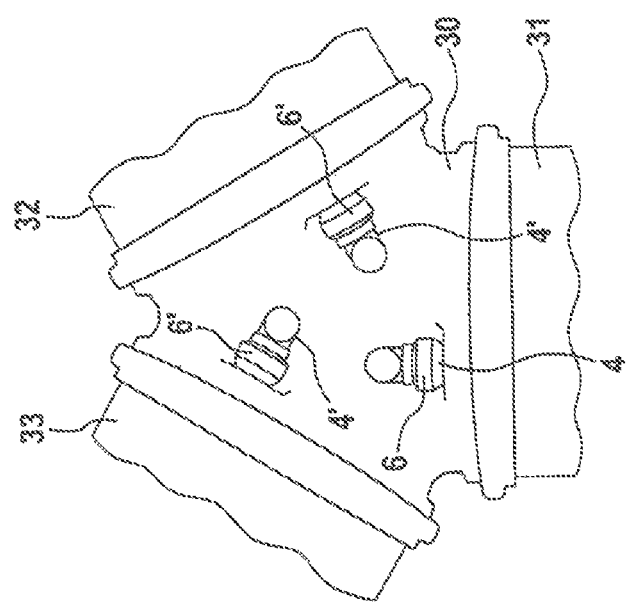
FIG. 2 shows a schematic representation of a rotor hub with three drive devices.

The individual drive devices 6, 6' are arranged in an identical relative position in relation to the rotor blades 31-33 (see FIG. 2). This means that they are arranged with a different orientation with regard to an earth-fixed reference. As a result, in the maintenance position the geodetic low points 4, 4' of the drive devices 6, 6' are located at different positions of the drive devices 6, 6'. Represented in FIG. 3 is that drive device 6 which is associated with the rotor blade 31 which points to the ground. The drive device is located in its first position, i.e. with the standard sump 63 at the bottom as known from the prior art, wherein its geodetic low point 4 lies in the region of the sump 63. Depending upon the construction of the gearbox housing 60 and the respective sump 63, the first position can also differ from the position which is shown here. The drive device 6, 6' can be rotated by 180°, for example. In the case of the other drive devices 6', which are associated with the rotor blades 32, 33 which point upward in the maintenance position and are therefore oriented in a tilted manner, their geodetic low point 4' is not located in the region of the sump 63, however, but in the region of the respective mirrored sump 64 according to the invention. This is shown in more detail in FIG. 4. The upper drive unit 6' is rotated by 120 degrees in relation to the lower drive unit 6 so that its geodetic low point 4' is located on the mirrored sump 64, to be more exact, in fact, in the region of the second outlet opening 66. At the position of the oil level 5', it is seen that the lubricating oil can also be drained from the drive device 6' which is tilted in the maintenance position, specifically via the second outlet opening 66.

Connecting valves 7, which are constructed as safety valves, are arranged in the first and second outlet openings 65, 66. The connecting valves comprise a sealing body 70 with a male thread 71 which is screwed into a corresponding mating thread of the outlet openings 65, 66. The sealing body 70 has a through-opening 72 in which a sealing piston 73 is accommodated in a longitudinally movable manner. The sealing piston functions as a valve which shuts off the flow of lubricating oil through the through-opening 72. At the rear end of the through-opening 72, provision is made on the sealing body 70 for a threaded holder 74 for a connecting hose 80, which can be covered by a protective cap 75. The sealing piston 73 projects by its rear end from the threaded holder 74. If the connecting hose 80 is seated by its headpiece 81 upon the threaded holder (after removal of the protective cap 75), then the headpiece 81 pushes the sealing piston 73 forward and so opens the valve. The lubricating oil can flow through the through-opening 72 into the connecting hose 80. The safety valves 7 function as quick-release couplings.

On the drive device 6, which is associated with the rotor blade 31 which points downward in the maintenance position, the safety valve 7 is provided in the first outlet opening 65, and in the case of the drive devices 6', which are arranged in manner tilted by 120 degrees and associated with the rotor blades 32, 33 which point upward in the maintenance position, the safety valves are provided in the second outlet openings 66, 66' of the drive devices. In addition, the safety valves 7 can also be provided at the top on the oil chamber 62, that is to say in the second outlet opening 66 of the drive device 6 or in the first outlet opening 65' of the tilted drive device 6'. The safety valves enable the quick connection of a filling hose, wherein with the connecting hose 80 connected at the same time, as described previously, a rapid filling or flushing of the drive devices 6, 6' can be undertaken. Instead of this, a vent valve or a dummy plug can also be provided.

For the oil change, an oil change device 9 can be used. The oil change device has at least one bi-directional pump connection 92 which via a connecting hose 80 can be connected to the first outlet opening 65 of the drive device 6 and to the second outlet opening 66 of the drive devices 6'. A waste-oil outlet 93 of the oil change device 9 can be connected via a waste-oil connection 95 to a waste-oil container 97. A fresh-oil inlet 94 of the oil change device 9 can be connected via a fresh-oil connection 96 to a fresh-oil container 98. Furthermore, the oil change device has a pump device 100. Moreover, the pumped out and pumped in quantity of oil can be controlled by means of a control unit 91 on the oil change device 9. The control unit 91 and the pump device 100 can be integrated either into the oil change device 9 or be connected to the oil change device 9 as an additional element. The oil change device 9 with regard to its size and weight is created so that it can be carried by one person.

If the oil change device 9 is provided with at least two bi-directional pump connections 92, then these can be used in order to flush a drive device 6, 6' in each case. If twice as many pump connections 92 as drive devices 6, 6' are provided on the oil change device, all the drive devices can be flushed at the same time. For the flushing process, a first pump connection 92 is then connected to a first outlet opening 65 and a second pump connection 92 is connected to a second outlet opening 66. During corresponding controlling of the oil change device 9, oil can then be delivered from the fresh-oil container 98 to the drive device 6, 6' and from there back to the waste-oil container 97, and the drive device 6, 6' can therefore be flushed.

In a further exemplary embodiment of the invention, provision is additionally made for a compressed-air unit 99 which is connected via a compressed-air outlet 90 and a compressed-air connection 84 to the second outlet opening 66 of the drive device 6 and to the first outlet openings 65 of the drive device 6', that is to say to the openings which are arranged above the desired oil level 5. The compressed-air unit 99 can either be integrated into the oil change device 9 or be connected as an additional unit to the oil change device.

An oil change is described in the following text based on the exemplary embodiment.

For an oil change of the drive devices 6, 6', the rotor 3 is rotated into the maintenance position. In this case, it is insignificant which rotor blade 31-33 is oriented vertical downward; it may be assumed that rotor blade 31 points downward, as shown in FIG. 1. In the exemplary embodiment, the drive device 6 which is associated with this rotor blade 31 is oriented vertically downward, as shown in FIG. 3. The drive devices 6' which are associated with the two other rotor blades 32, 33 are tilted to the right or to the left by 120° in each case with regard to FIG. 3.

Figure 4:
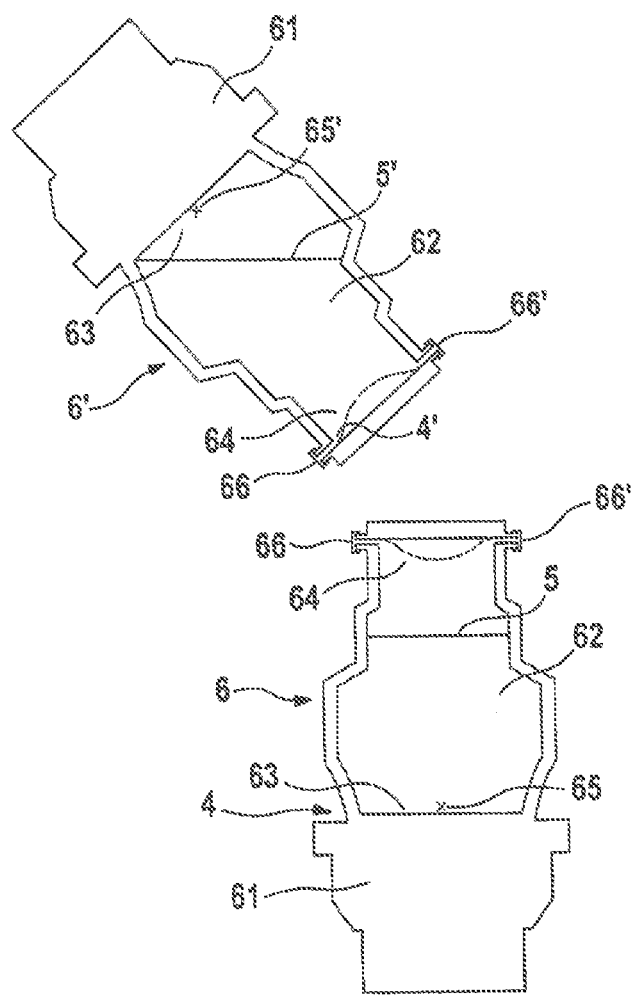
FIG. 4 shows a section through two drive devices in different positions.
Figures 5, 6:
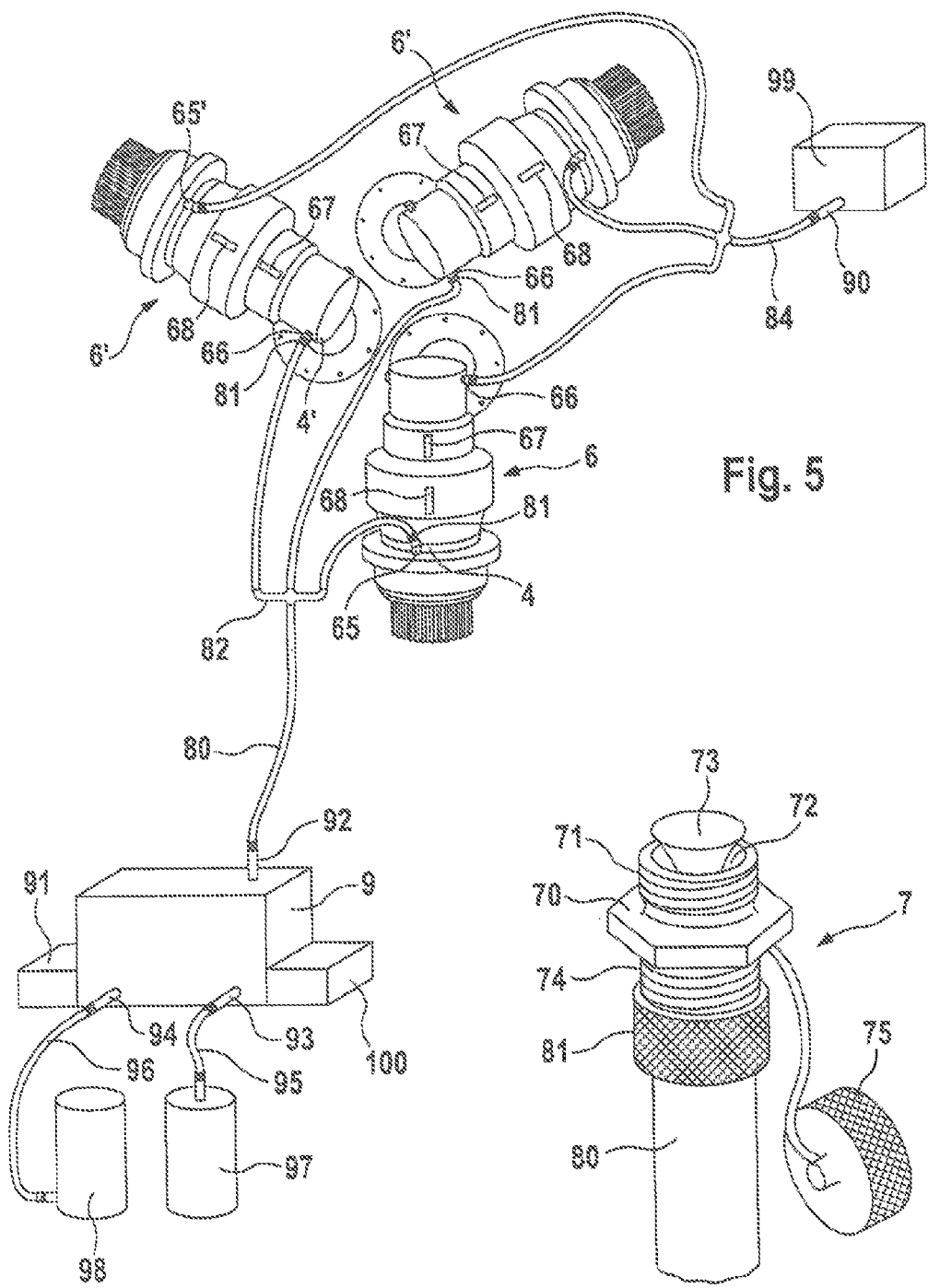
FIG. 5 shows a schematic representation of the oil change device.
FIG. 6 shows a representation of a connecting valve.

Each of the drive devices 6, 6' has a first or second outlet opening 65, 66 at the respective geodetic low point 4, 4', as shown in FIG. 4. For carrying out maintenance, this first or second outlet opening 65, 66 is connected via the hose connection 80 to the oil change device 9. This is shown in FIG. 5. Since these outlet openings are all located at the respective geodetic low point 4, 4', they can all be connected to the oil change device 9 at the same time for the emptying and can be opened via the connecting valve 7, for example. For draining the oil, on the drive devices 6, 6' which are connected to the oil change device 9 the other outlet opening 66, 65' which is located above the desired oil level 5 is opened. The oil is now drained from the associated drive devices 6, 6' at the same time and flows from the oil change device 9 via the waste-oil outlet 93 into the waste-oil container 97. After draining the oil, fresh oil is delivered by means of the pump device 100 of the oil change device 9 from the fresh-oil container 98 via the fresh-oil inlet 94 into the associated drive devices 6, 6' until the oil level has reached its desired level 5. For determining the oil level inside the drive devices 6, 6', the sight glasses 67, 68 can be used. At the end, all open first and second outlet openings 65, 66 of the drive devices 6, 6' are closed and the oil change device 9 is disconnected. The wind power plant can then be put back into operation.

An acceleration of the draining is achieved by the pumping in of compressed air into the drive devices 6, 6'. The compressed air is admitted by means of the compressed-air unit 99 into the second or first outlet openings 66, 65 which are arranged above the desired oil level 5.

By the same token, the oil change device 9, by sucking out the oil, can accelerate the draining. The compressed-air connection 84 can also function as a flushing line and be connected to the oil change device 9.

The drained oil volume and the pumped-in oil volume can be automatically controlled by means of the control unit 91. The oil volumes are predetermined by the personnel for the control unit 91. The control unit 91 automatically switches off the pump device 100 of the oil change device 9 after the predetermined oil volumes have been achieved. This enables an unsupervised oil change. An unsupervised oil change is advantageous since during this time the personnel can be used for other maintenance operations.

A further advantage results from the use of safety oil valves 7 at the outlet openings 65, 66, 66', on the oil change device 9 and on the compressed-air unit 99 in combination with hose couplings which are compatible with the safety oil valves 7. Consequently, the risk of damage to the environment by inadvertently escaping oil is reduced for one thing, and for another thing the valves are automatically opened after connecting to the hose, which simplifies the procedure and further reduces the time consumption of the oil change.

If all the advantageous aspects of the invention are utilized, the personnel requirement is considerably reduced so that significant cost savings for the regular maintenance are possible. Above all, this method makes a significant impact on offshore wind power plants because the transporting and accommodating of personnel are possible only with high financial expenditure so that a reduction of the personnel requirement is very advantageous.

The invention claimed is:

1. A method for carrying out an oil change on a wind power plant comprising a tower with an engine nacelle located upon the tower, and a wind-powered rotor with a plurality of rotor blades rotatably attached to the engine nacelle, the rotor having a plurality of drive devices arranged with different orientation, comprising:
    rotating the rotor into a maintenance position,
    subsequently draining oil from a first of the drive devices,
    filling the first drive device with fresh oil,
    draining the oil from a second of the drive devices which is oriented differently from the first drive device, and filling the second drive device with fresh oil,
    wherein a first closable outlet opening on a sump of the first drive device is rotated into a geodetic low point in the maintenance position of the rotor, each of the drive devices, on an end of its housing opposite the sump, having a mirrored sump with a second closable outlet opening, and
    wherein the draining of the oil from the second drive device is carried out via the second closable outlet opening so that the rotor, during and between the draining of the oil from the first and second drive devices, can maintain its rotated position.

2. The method of claim 1, wherein the draining of the oil is assisted by pumping.

3. The method of claim 1, wherein the draining of the oil is assisted by admitting compressed air into one or both of the first and second drive devices.

4. The method of claim 1, wherein the drained and replenished oil volumes are automatically controlled and after a selectable delivered oil volume the pumping process is terminated.

5. The method of claim 1, wherein the connection between the first outlet opening and an oil change device is used bi-directionally for the draining and filling.

6. The method of claim 1, wherein the plurality of drive devices comprises blade adjustment gears.

7. A wind power-plant drive device comprising a housing which encloses an oil chamber and which on a lower end of the housing in a first position has a sump which at a geodetic low point has a first outlet opening for accommodating a drain valve, wherein at one end of the housing, opposite the sump, a mirrored sump is formed and has a second outlet opening for accommodating a second drain valve, the mirrored sump being configured such that in a second position which is different from the first position the second outlet opening is located at the geodetic low point.

8. The wind power-plant drive device of claim 7, comprising an oil level indicator for the mirrored sump.

9. The wind power-plant drive device of claim 8, wherein the oil level indicator comprises a sight glass.

10. The wind power-plant drive device of claim 7, wherein the oil level indicator is constructionally combined with an oil level indicator for the sump.

11. The wind power-plant drive device of claim 7, wherein a quick-release coupling is arranged as a connecting valve in at least one of the outlet openings.

12. The wind power-plant drive device of claim 7, wherein one or both of a vent valve and a dummy plug is arranged on the sump in the second outlet opening.

13. An arrangement for an automated oil change on wind power plants, comprising an oil change device with a control unit, a fresh-oil connection and waste-oil connection, and at least one connecting hose with a headpiece configured to connect to a drive device of a wind power plant, wherein the oil change device is configured to simultaneously connect to a plurality of drive devices, wherein the connecting hose comprises a hose set comprising a plurality of individual hoses, wherein each of the individual hoses are connected on one hose end by the headpiece to the drive device and on the other hose end to a pump connection.

14. The arrangement of claim 13, wherein the connecting hose comprises a distribution piece to which at least two headpieces are connected.

15. The arrangement of claim 13, wherein the drive device comprises a pitch drive.

16. The arrangement of claim 13, wherein the drive device comprises an azimuth drive.

\* \* \* \* \*